(12) United States Patent
Mozer et al.

(10) Patent No.: US 12,248,603 B2
(45) Date of Patent: Mar. 11, 2025

(54) SANITIZING PERSONALLY IDENTIFIABLE INFORMATION (PII) IN AUDIO AND VISUAL DATA

(71) Applicant: Sensory, Incorporated, Santa Clara, CA (US)

(72) Inventors: Todd Mozer, Los Altos Hills, CA (US); Pieter Vermeulen, Portland, OR (US); Jonathan Welch, Douglasville, GA (US)

(73) Assignee: Sensory, Incorporated, Santa Clara, CA (US)

( * ) Notice: Subject to any disclaimer, the term of this patent is extended or adjusted under 35 U.S.C. 154(b) by 387 days.

(21) Appl. No.: 17/579,383

(22) Filed: Jan. 19, 2022

(65) Prior Publication Data

US 2023/0229803 A1    Jul. 20, 2023

(51) Int. Cl.
| | |
|---|---|
| *G06F 21/00* | (2013.01) |
| *G06F 21/62* | (2013.01) |
| *G06T 5/70* | (2024.01) |
| *G06T 7/194* | (2017.01) |
| *G06V 20/62* | (2022.01) |
| *G06V 20/70* | (2022.01) |

(Continued)

(52) U.S. Cl.
CPC ............ *G06F 21/6245* (2013.01); *G06T 5/70* (2024.01); *G06T 7/194* (2017.01); *G06V 20/63* (2022.01); *G06V 20/70* (2022.01); *G06V 40/171* (2022.01); *G10L 15/02* (2013.01); *G10L 21/007* (2013.01); *G06T 2207/20081* (2013.01); *G06T 2207/30196* (2013.01)

(58) Field of Classification Search
CPC .... G06F 21/6245; G06F 18/214; G06F 18/40; G06F 21/6254; G06T 5/70; G06T 7/194; G06T 2207/20081; G06T 2207/30196; G06V 20/63; G06V 20/70; G06V 40/171; G06V 20/52; G10L 15/02; G10L 21/007; G10L 2021/0135
See application file for complete search history.

(56) References Cited

U.S. PATENT DOCUMENTS

| | | | |
|---|---|---|---|
| 10,529,336 B1 | 1/2020 | Matthews et al. | |
| 11,039,013 B1 * | 6/2021 | Garrod | .................... G10L 15/26 |

(Continued)

*Primary Examiner* — Michael M Lee
(74) *Attorney, Agent, or Firm* — Fountainhead Law Group, PC (57) ABSTRACT

Techniques for sanitizing personally identifiable information (PII) from audio and visual data are provided. For instance, in a scenario where the data comprises an audio signal with speech uttered by a person P, these techniques can include removing/obfuscating/transforming speech-related PII in the audio signal such as pitch and acoustic cues associated with P's vocal tract shape and/or vocal actuators (e.g., lips, nasal air bypass, teeth, tongue, etc.) while allowing the content of the speech to remain recognizable. Further, in a scenario where the data comprises a still image or video in which a person P appears, these techniques can include removing/obfuscating/transforming visual PII in the image or video such as P's biological features and indicators of P's location/belongings/data while allowing the general nature of the image or video to remain discernable. Through this PII sanitization process, the privacy of individuals portrayed in the audio or visual data can be preserved.

18 Claims, 6 Drawing Sheets

(51) Int. Cl.
*G06V 40/16* (2022.01)
*G10L 15/02* (2006.01)
*G10L 21/007* (2013.01)

(56) References Cited

U.S. PATENT DOCUMENTS

| | | | |
|---|---|---|---|
| 11,513,762 | B2 | 11/2022 | Karri et al. |
| 11,748,510 | B1 | 9/2023 | Beveridge et al. |
| 2006/0080554 | A1* | 4/2006 | McDonald .......... G06F 21/6254 713/189 |
| 2012/0310646 | A1 | 12/2012 | Hu et al. |
| 2014/0280261 | A1* | 9/2014 | Butler ................ G06F 21/6245 707/756 |
| 2015/0213288 | A1* | 7/2015 | Bilodeau ............ G06F 21/6254 726/26 |
| 2016/0104474 | A1* | 4/2016 | Bunn .................... G10L 21/003 704/261 |
| 2017/0161516 | A1* | 6/2017 | Mondal .................. H04L 63/06 |
| 2017/0270919 | A1* | 9/2017 | Parthasarathi .......... G10L 17/06 |
| 2018/0336370 | A1* | 11/2018 | Schonwald ............ G06F 21/602 |
| 2019/0190890 | A1* | 6/2019 | Druker ................ G06F 21/6254 |
| 2019/0377901 | A1* | 12/2019 | Balzer ................ H04L 63/0421 |
| 2019/0384984 | A1* | 12/2019 | Rav-Acha .............. G06V 10/26 |
| 2020/0175961 | A1 | 6/2020 | Thomson et al. |
| 2020/0258535 | A1* | 8/2020 | Vatanparvar .......... A61B 5/4803 |
| 2020/0285771 | A1* | 9/2020 | Dey .................... G06F 21/6272 |
| 2021/0012026 | A1* | 1/2021 | Taylor .................... G06N 20/00 |
| 2021/0034585 | A1 | 2/2021 | Downs et al. |
| 2021/0073412 | A1* | 3/2021 | Kvochko .............. G06T 1/0021 |
| 2021/0350025 | A1* | 11/2021 | Venkataraman ..... A61B 90/361 |
| 2022/0084521 | A1* | 3/2022 | Arvind ................ G06F 21/6245 |
| 2022/0129582 | A1 | 4/2022 | Lange |
| 2022/0156406 | A1* | 5/2022 | Yang .................. G06F 21/6254 |
| 2022/0207181 | A1 | 6/2022 | Ng |
| 2022/0277565 | A1* | 9/2022 | Haro .................... G06V 40/174 |
| 2022/0414264 | A1* | 12/2022 | Ananthanarayanan ...................... G06F 21/6254 |
| 2023/0057547 | A1* | 2/2023 | Shah .................. G06F 21/6254 |

* cited by examiner

SANITIZING PERSONALLY IDENTIFIABLE INFORMATION (PII) IN AUDIO AND VISUAL DATA

BACKGROUND

Unless otherwise indicated, the subject matter described in this section is not prior art to the claims of the present application and is not admitted as being prior art by inclusion in this section.

Audio and visual data that is captured via microphones, still image cameras, video cameras, and the like can contain a variety of different types of information that permit the direct or indirect identification of individuals portrayed in the data (known as personally identifiable information or PII). For example, a captured audio signal can include speech, which exhibits certain acoustic characteristics such as pitch and higher-order frequency components (e.g., formants F1, F2, and F3 as well as characteristics of the glottal excitation) that can be used to trace the identity of the speaker because of their unique vocal tract characteristics. Similarly, a captured still image or video can include the biological appearance of a person (e.g., facial features, skin texture/tone, etc.) and/or visual cues pertaining to the person's location, belongings, data, and so on that can be used to trace the identity of that person.

When audio or visual data which contains PII is used to build machine learning (ML) models that perform inference (i.e., generate predictions) on similar data, there is typically a need at some point in the model creation process for another person to manually inspect the data and annotate it with appropriate labels so that the ML model can be informed about what the data represents for training purposes. In the case of biometric identification models, these labels relate to the identities of individuals appearing in the data. However, for many other types of ML models that act upon audio or visual data, there is no need for the person performing the labeling task (i.e., labeler) to know anything regarding the identities of those individuals.

For example, speech recognition—which involves identifying the speech uttered in an audio signal—does not require the labeler to know who uttered the speech; the labeler need only be able to recognize the words/sentences spoken. As another example, liveness detection—which involves determining whether a person appearing in an image or video is a live person rather than a facsimile—does not require the labeler to know who is appearing in the image/video. Instead, the labeler need only be able to determine whether that person (whoever it is) is real and not a photograph, 3-D printed head, etc.

DETAILED DESCRIPTION

In the following description, for purposes of explanation, numerous examples and details are set forth in order to provide an understanding of specific embodiments. It will be evident, however, to one skilled in the art that certain embodiments can be practiced without some of these details or can be practiced with modifications or equivalents thereof.

1. Overview

Embodiments of the present disclosure are directed to techniques for sanitizing (or in other words, removing, obfuscating, or transforming) PII in audio or visual data while keeping the data's non-PII elements intact. For instance, in a scenario where the data comprises an audio signal with speech uttered by a person P, these techniques can include removing/obfuscating/transforming speech-related PII in the audio signal such as pitch, formants F1-F3, and acoustic cues associated with P's vocal tract shape and/or vocal actuators (e.g., lips, nasal air bypass, teeth, tongue, etc.) while allowing the content of the speech to remain recognizable. Further, in a scenario where the data comprises a still image or video in which a person P appears, these techniques can include removing/obfuscating/transforming visual PII in the image or video such as P's biological features and indicators of P's location/belongings/data while allowing the general nature of the image or video to remain discernable.

Through this PII sanitization process, the techniques of the present disclosure can preserve the privacy of individuals portrayed in the audio or visual data while retaining the statistics and correlations within the data, which is useful for various use cases and applications. For example, in one set of embodiments, the sanitized (and thus, identity-neutral) version of the data can be provided to an ML training/inference system which includes a supervised ML model that is capable of operating on identity-neutral information (e.g., a speech recognition model, a liveness detection model, etc.) and a labeler or other similar persona that is tasked with manually inspecting and labeling the data for model training purposes. In these embodiments, the labeler can carry out their task without learning anything regarding the identities of individuals appearing in the data, thereby allaying potential privacy concerns. In another set of embodiments, the sanitized data can be used for model training and inference in unsupervised ML settings. The foregoing and other aspects of the present disclosure are described in further detail below.

2. Example Environment and High-Level Design

Figure 1:
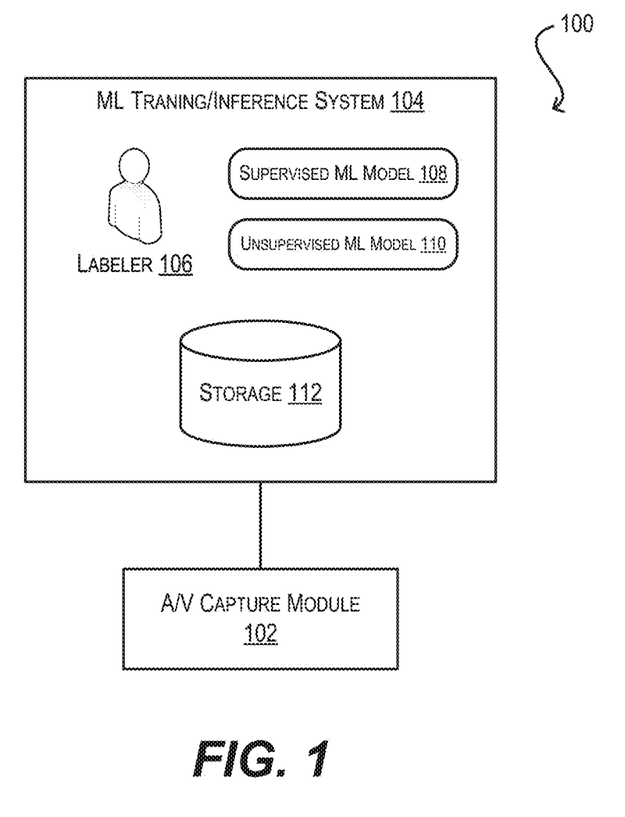
FIG. 1 depicts an example environment.

FIG. 1 depicts an example environment 100 in which embodiments of the present disclosure may be implemented. As shown, environment 100 includes an audio/visual (A/V) capture module 102 such as a microphone, still camera, video camera, etc. that is communicatively coupled with an ML training/inference system 104. In one set of embodiments, A/V capture module 102 may be part of a client device that is operated by an end-user (e.g., a smartphone, smart home appliance, etc.) and ML training/inference system 104 may run on one or more remote servers, such as a cloud server. In other embodiments, some or all of the functionality of ML training/inference system 104 may be co-located with A/V capture module 102.

In operation, ML training/inference system 104 can receive audio or visual data captured by A/V capture module 102 (e.g., audio signals or still images/videos) and use this data for various machine learning purposes. For instance, in the scenario where ML training/inference system 104 includes a supervised ML model 108, system 104 may provide the data to a labeler 106 that is tasked with manually inspecting and annotating the data with appropriate labels for training model 108. Alternatively, in the scenario where ML training/inference system 104 includes an unsupervised ML model 110, the data may be used to directly build model 110. Further, if supervised ML model 108 or unsupervised ML model 110 has already been trained, the data can be provided as input to the model for inference, resulting in a predicted output. Yet further, the data can be written to a storage component 112 of ML training/inference system 104 for future training or inference with respect to supervised ML model 108, unsupervised ML model 110, or a different model.

As noted in the Background section, although some types of ML models such as biometric identification models may require labeler 106 to identify, or at least determine identifying characteristics of, individuals appearing in the captured data in order to carry out the labeling task, many other types of ML models do not. Examples of these other types of ML models (referred to herein as identity-neutral models) include speech recognition models, object recognition models, liveness detection models, and so on. For identity-neutral models, it would be useful to have techniques for enabling model training and inference without revealing the identities of the individuals appearing in the captured data to labeler 106 or anyone else, as this would mitigate privacy concerns arising out of such data collection and use.

Figure 2:
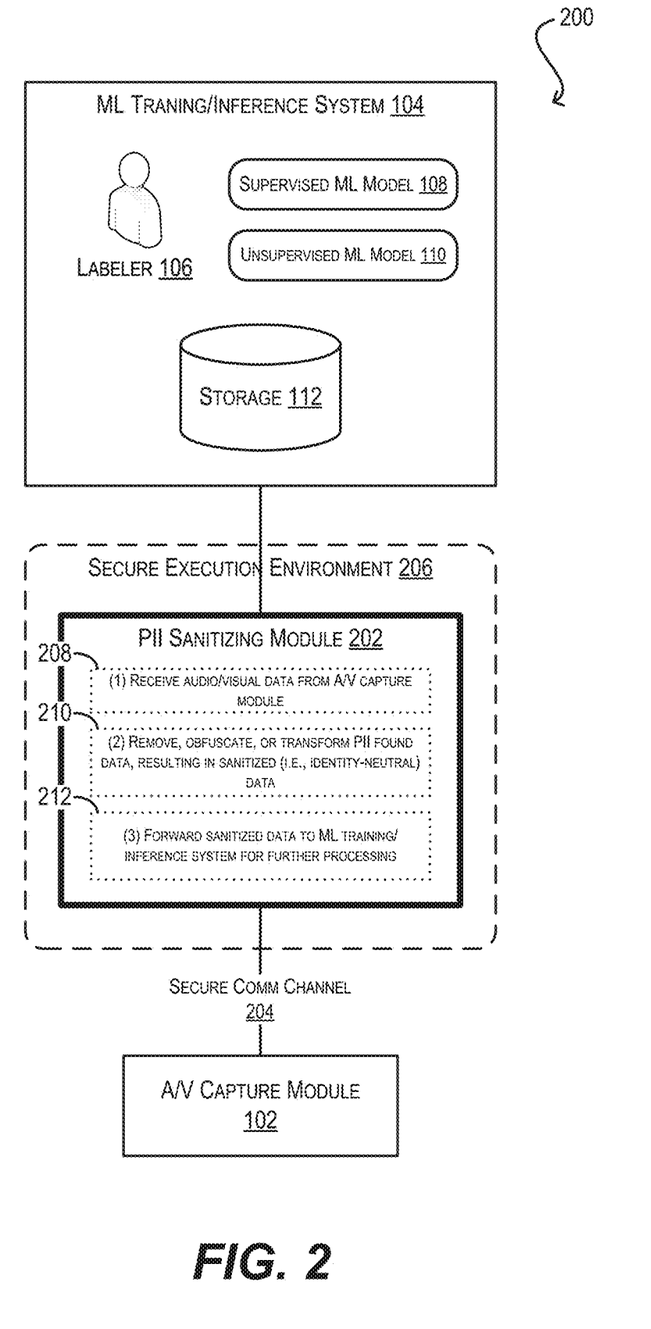
FIG. 2 depicts a version of the environment of FIG. 1 that implements the techniques of the present disclosure according to certain embodiments.

To achieve this, FIG. 2 depicts an enhanced version of environment 100 of FIG. 1 (i.e., environment 200) that includes a novel PII sanitizing module 202 between A/V capture module 102 and ML training/inference system 104. PII sanitizing module 202 is coupled with A/V capture module 102 via a secure communication channel 204 and runs within a secure execution environment 206 that cannot be tampered with by attackers and does not have any long-term storage capabilities.

In one set of embodiments, PII sanitizing module 202 may be co-located with A/V capture module 102 on, e.g., an end-user client device. In these embodiments, PII sanitizing module 202 may be implemented in client device hardware (e.g., as a standalone integrated circuit or a region of an integrated circuit) or in client device software and secure communication channel 204 may be a local hardware or software link. In other embodiments, PII sanitizing module 202 may run one or more servers remote from A/V capture module 102 and secure communication channel 204 may be a network link that is encrypted via TLS (Transport Layer Security) or some other network security protocol.

As shown in FIG. 2, at a high level PII sanitizing module 202 can receive audio or visual data captured by A/V capture module 202 over secure communication channel 204 (step (1); reference numeral 208) and can remove, obfuscate, or transform PII found in that audio/visual data, resulting in identity-neutral data that is usable by ML training/inference system 104 for performing ML training and/or inference on ML models 108 and 110 but does not reveal anything regarding the identities of individuals appearing in the data to system 104 (including labeler 106) (step (2); reference numeral 210). In particular, the sanitization performed at step (2) can strip out PII while preserving the statistics and correlations within the data that are needed for ML training/inference purposes. The specific mechanisms that module 202 can employ to perform this sanitization with respect to visual data and audio data comprising speech are detailed in sections (3) and (4) respectively below.

Then, upon completing its sanitization process, PII sanitizing module 202 can forward the identity-neutral data to ML training/inference system 104 (or some other downstream system) for further processing (step (3); reference numeral 212). For example, upon receiving the identity-neutral data, labeler 106 of system 104 can inspect and annotate the data with labels for training supervised ML model 108. Alternatively, the identity-neutral data can be applied to directly train (or re-train) unsupervised ML model 110 without labeling. Significantly, because the data stream forwarded by module 202 has been sanitized of all PII, system 104 will not be able to learn anything regarding the individuals appearing in that data, thereby preserving the privacy of those individuals.

It should be appreciated at FIGS. 1 and 2 are illustrative and not intended to limit embodiments of the present disclosure. For example, the various entities shown in these figures may be organized according to different arrangements/configurations or may include subcomponents or functions that are not specifically described. One of ordinary skill in the art will recognize other variations, modifications, and alternatives.

3. Sanitizing PII in Visual Data

Figure 3:
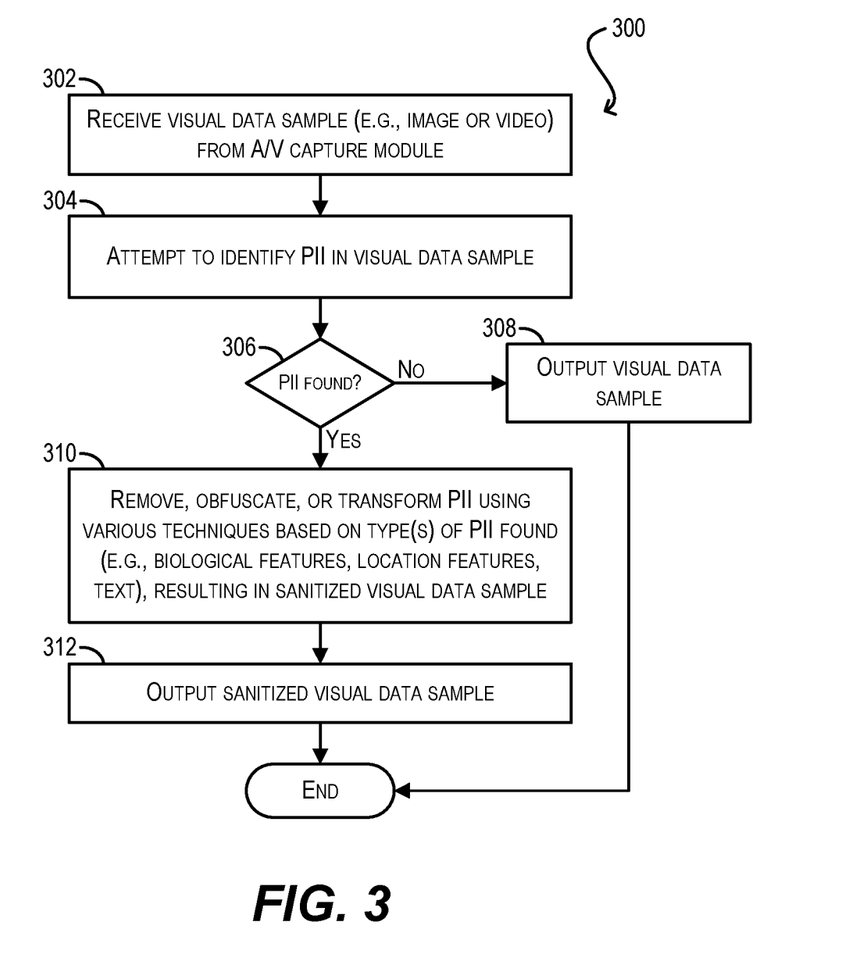
FIG. 3 depicts a flowchart for sanitizing PII from visual data according to certain embodiments.

FIG. 3 depicts a flowchart 300 that may be executed by PII sanitizing module 202 of FIG. 2 for sanitizing PII from visual data received from A/V capture module 102 according to certain embodiments.

Starting with steps 302 and 304, PII sanitizing module 202 can receive a visual data sample (e.g., an image or video) and attempt to identify PII in that sample. In one set of embodiments, the identification performed at step 304 can involve using an ML model (e.g., neural network, decision tree, support vector machine, etc.) that reads pixel values of the visual data sample and outputs region proposals (e.g., bounding boxes or segmentation maps) indicating regions in the visual data sample that are likely to contain PII of a given type. For example, for a region R1 with pixel values that the ML model has determined are indicative of eyes, nose, and/or mouth features, the ML model may output a region proposal indicating that R1 is likely to contain a face belonging to a person or a depiction of a person. And for a region R2 with pixel values that the ML model has determined are indicative of a street sign or some other location indicator, the ML model may output a region proposal indicating that R2 is likely to contain that street sign/location indicator.

In addition to (or in lieu of) the ML model above, the identification performed at step 304 can involve using optical character recognition (OCR) to recognize sequences of numbers, letters, and/or symbols in the visual data sample. These numbers, letters, or symbols can then be processed via a sequence template matching system or language model to identify text sequences or phrases which are known to constitute, or be revealing of, PII. For example, in the case where a sequence of numbers matching a template of the form ###-###-#### is found, PII sanitizing module 202 can conclude that this sequence likely represents a phone number. Further, in the case where a sequence of characters and symbols matching the template *@*.* is found, PII sanitizing module 202 can conclude that this sequence likely represents an email address.

At step 306, PII sanitizing module 202 can check whether any PII was found in the visual data sample per the identification performed at block 304. If the answer is no, PII sanitizing module 202 can output the visual data sample without modifications (step 308) and flowchart 300 can end.

However, if the answer at step 306 is yes, PII sanitizing module 202 can sanitize (i.e., remove, obfuscate, or transform) the identified PII, thereby converting the visual data sample into a sanitized/identity-neutral form (step 310). The specific manner in which model 202 performs this sanitization can differ based on the types of PII found. For example, for PII constituting biological features (e.g., a face), PII sanitizing module 202 can obfuscate the biological features by either (1) blurring the features while retaining their general shape and position, or (2) replacing the features with a random pattern, a generic placeholder (e.g., a face icon), or a constant color value. Alternatively, PII sanitizing module 202 can use a generative ML model to transform the biological features into those of an entirely different person (e.g., a random or a default person), or replace the entire data sample with one or more embedding vectors (i.e., low-dimensional representations) of the biological features via an ML model that has been trained to construct such embedding vectors in an identity-neutral manner.

For PII constituting location features such as street signs, geographic landmarks, house numbers, and the like, PII sanitizing module 202 can use a semantic segmentation model to retain the features of interest in the foreground of the visual data sample (e.g., people and/or objects) while replacing all other pixels with a constant "green screen" value (or some other value), thereby removing location features that may appear in the sample's background. Alternatively, PII sanitizing module 202 can use a generative model to retain the features of interest in the foreground and replace all other pixels with some neutral/synthetic environment, thereby transforming the background location depicted in the original sample into a completely different location.

And for PII constituting text, PII sanitizing module 202 can obfuscate the text by either blurring/censoring the text or replacing it with a generic template representative of the type of information the text was meant to convey (e.g., 555-555-5555 in the case of a phone number).

Finally, upon completing the sanitization at step 310, PII sanitizing module 202 can output the sanitized version of the visual data sample (step 312) and flowchart 300 can end.

4. Sanitizing PII in Audio Data with Speech

Figure 4:
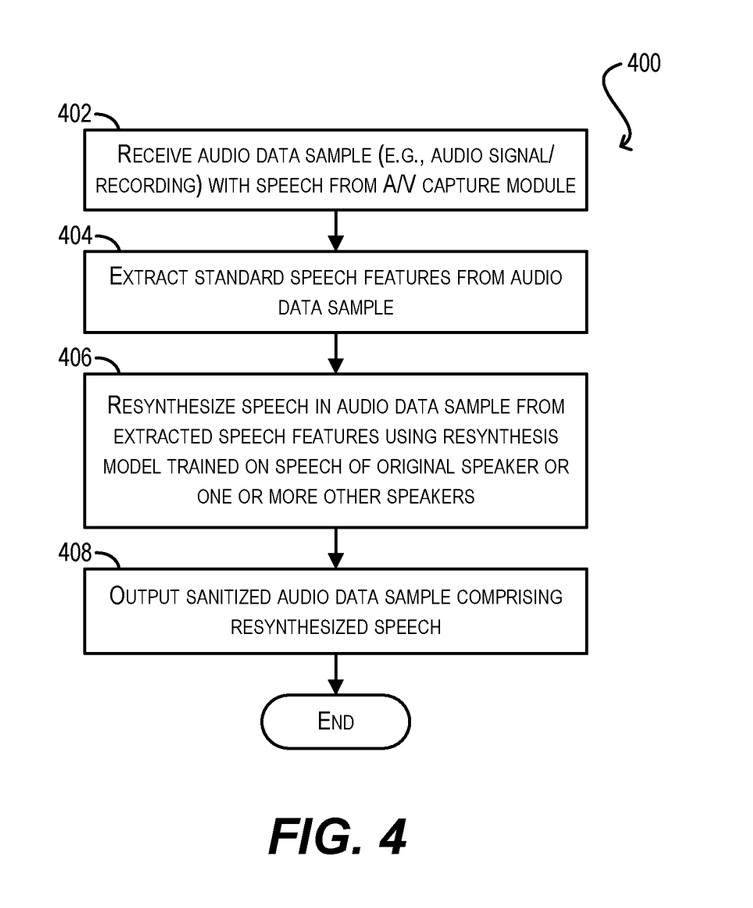
FIGS. 4 and 5 depict flowcharts for sanitizing PII from audio data comprising speech according to certain embodiments.

FIG. 4 depicts a flowchart 400 of a first approach that may be implemented by PII sanitizing module 202 of FIG. 2 for sanitizing PII from audio data comprising speech that is received from A/V capture module 102 according to certain embodiments. This first approach involves extracting standard speech features from the speech, which will typically remove most types of significant PII (e.g., pitch). Note that these extracted speech features can be used directly for inference, however, the removed PII components should be re-inserted in some form for labeling. Accordingly, flowchart 400 also includes steps for resynthesizing the original speech from the extracted features. This permits, e.g., a labeler to listen to and transcribe the resynthesized speech for ML model training purposes. Generally speaking, resynthesizing the speech from the extracted speech features will remove enough PII to make it unidentifiable to humans.

Starting with steps 402 and 404 of flowchart 400, PII sanitizing module 202 can receive an audio data sample (e.g., an audio signal/recording) that includes speech and can extract standard speech features from the speech using one or more known methods. Examples of these standard speech features include filterbank energies, mel-scaled cepstral coefficients, and perceptual linear prediction features. As noted above, the extraction of these features will generally remove significant PII from the audio data sample without negatively affecting speech recognition accuracy.

At step 406, PII sanitizing module 202 can resynthesize the speech in the original audio data sample from the extracted features via an ML resynthesis model that is trained on the speech of the original speaker or one or more other speakers (e.g., random speakers or a default speaker).

In other words, the resynthesis model is trained by receiving speech features as input and learning to output speech fragments uttered the by the original speaker or the one or more other speakers that correspond to the input speech features. As mentioned previously, performing this resynthesis from the extracted speech features will likely remove enough PII to make the resynthesized speech unidentifiable to humans (although it may be identifiable by speaker identification systems that have access to reference recordings of the original speaker).

Finally, at block 408, PII sanitizing module 202 can output a sanitized audio sample comprising the resynthesized speech and flowchart 400 can end.

Figure 5:
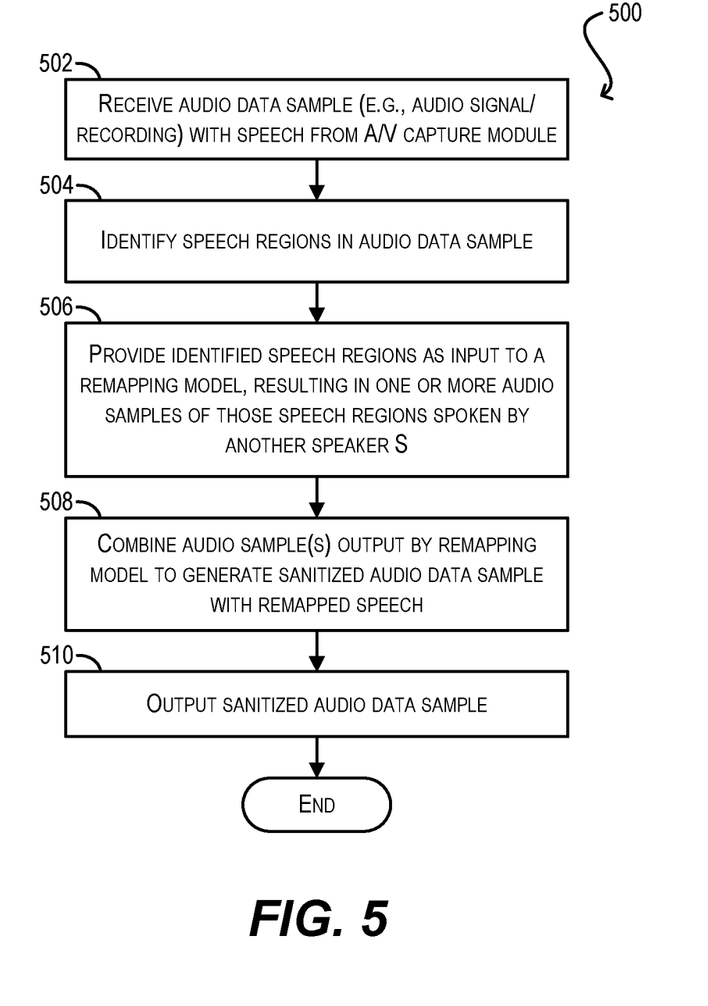

FIG. 5 depicts a flowchart 500 of a second approach that may be implemented by PII sanitizing module 202 for sanitizing PII from audio data comprising speech that is received from A/V capture module 102 according to certain embodiments. This second approach involves using an ML remapping model to directly remap the speech included in the audio data sample to the speech of one or more other speakers (e.g., random speakers or a default speaker), without performing speech feature extraction.

In the case where the remapping model is designed to remap speech to a specific/default speaker, the remapping model can be trained by receiving training data from many different speakers speaking certain sentences or words and training the model to output the same sentences/words as spoken by that specific/default speaker. Upon completing this training, the remapping model will remap the speech of any speaker to sound like the specific/default speaker.

In the case where the remapping model is designed to remap speech to some random speaker target, the remapping model can be trained by receiving training data from many different speakers speaking certain sentences or words and training the model to output the same sentences/words as spoken by any one of a number of random speakers. Upon completing this training, the remapping model will remap the speech of any speaker to sound like some other random speaker.

Starting with block 502, PII sanitizing module 202 can receive an audio data sample (e.g., an audio signal/recording) comprising speech from A/V capture module 102.

At blocks 504 and 506, PII sanitizing module 202 can identify (using, e.g., a voice activity detector (VAD)) speech regions in the audio data sample and can provide the identified speech regions as input to the remapping model, resulting in one or more audio samples of those speech regions as spoken by another speaker S. As mentioned above, speaker S may be a specific/default speaker or a randomly chosen speaker.

At block 508, PII sanitizing module 202 can combine the one or more audio samples output by the remapping model and generate a new, sanitized audio data sample with this remapped speech. Finally, PII sanitizing module 202 can output the sanitized audio data sample (block 510) and flowchart 500 can end.

It should be noted that in certain embodiments, the approaches of FIGS. 4 and 5 can be combined into a hybrid approach whereby (1) standard speech features are first extracted from the audio data sample received from A/V capture module 102 (in order to remove most PII), and (2) those extracted speech features are subsequently remapped to standard speech features extracted from the speech of another speaker S (either a specific/default speaker or a random speaker). This hybrid approach has the effect of removing any remaining PII that may still be present in the speech features extracted from the original audio data sample.

Because the output of the hybrid approach is a set of sanitized speech features (rather than sanitized speech) corresponding to some different speaker S, speech resynthesis is needed in order to allow a labeler to listen to and label that output. This resynthesis can be performed in a manner similar to step 406 of flowchart 400 (i.e., via an ML resynthesis model). Note that resynthesizing speech from the sanitized speech features output by the hybrid approach (rather than from the "un-sanitized" features extracted via the approach shown in FIG. 4) has the advantage of preventing speaker identification systems from identifying the original speaker using the resynthesized speech.

5. Example Computing Device

Figure 6:
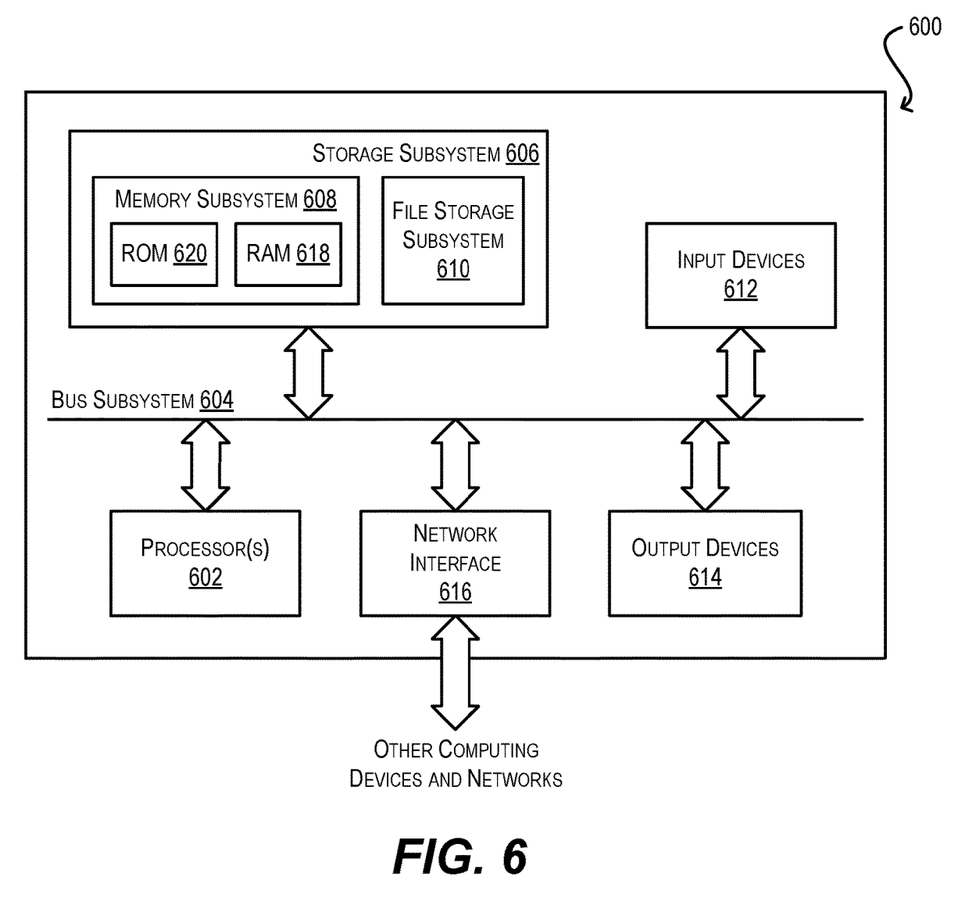
FIG. 6 depicts an example computing device according to certain embodiments.

FIG. 6 is a simplified block diagram of an example computing device 600 according to certain embodiments. Computing device 600 may be used to implement, either in hardware, software, or a combination thereof, any of the techniques described in the foregoing sections. As shown, computing device 600 includes one or more processors 602 that communicate with a number of peripheral devices via a bus subsystem 604. These peripheral devices include a storage subsystem 606 (comprising a memory subsystem 608 and a file storage subsystem 610), input devices 612, output devices 614, and a network interface subsystem 616.

Bus subsystem 604 can provide a mechanism for letting the various components and subsystems of computing device 600 communicate with each other as intended. Although bus subsystem 604 is shown schematically as a single bus, alternative embodiments of the bus subsystem can utilize multiple buses.

Network interface subsystem 616 can serve as an interface for communicating data between computing device 600 and other computing devices or networks. Embodiments of network interface subsystem 616 can include wired (e.g., coaxial, twisted pair, or fiber optic Ethernet) and/or wireless (e.g., Wi-Fi, cellular, Bluetooth, etc.) interfaces.

Input devices 612 can include a camera, a touch-screen incorporated into a display, a keyboard, a pointing device (e.g., mouse, touchpad, etc.), a microphone, and/or other types of input devices. In general, use of the term "input device" is intended to include all possible types of devices and mechanisms for inputting information into computing device 600.

Output devices 614 can include a display subsystem (e.g., a flat-panel display), an audio output device, and/or the like. In general, use of the term "output device" is intended to include all possible types of devices and mechanisms for outputting information from computing device 600.

Storage subsystem 606 includes a memory subsystem 608 and a file/disk storage subsystem 610. Subsystems 608 and 610 represent non-transitory computer-readable storage media that can store program code and/or data that provide the functionality of various embodiments described herein.

Memory subsystem 608 can include a number of memories including a main random access memory (RAM) 618 for storage of instructions and data during program execution and a read-only memory (ROM) 620 in which fixed instructions are stored. File storage subsystem 610 can provide persistent (i.e., non-volatile) storage for program and data files and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computing device 600 is illustrative and not intended to limit embodiments of the present disclosure. Many other configurations having more or fewer components than computing device 600 are possible.

The above description illustrates various embodiments of the present disclosure along with examples of how aspects of the present disclosure may be implemented. The above examples and embodiments should not be deemed to be the only embodiments and are presented to illustrate the flexibility and advantages of the present disclosure as defined by the following claims. For example, although certain embodiments have been described with respect to particular process flows and steps, it should be apparent to those skilled in the art that the scope of the present invention is not strictly limited to the described flows and steps. Steps described as sequential may be executed in parallel, order of steps may be varied, and steps may be modified, combined, added, or omitted.

Further, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations, and equivalents will be evident to those skilled in the art and may be employed without departing from the spirit and scope of the disclosure as set forth in the following claims.

What is claimed is:

1. A method comprising:

receiving, by a computing device, one or more data samples from a capture module, the one or more data samples including an audio data sample;

sanitizing, by the computing device, personally identifiable information (PII) from the audio data sample, resulting in a sanitized version of the audio data sample, the sanitizing comprising:

identifying speech regions in the audio data sample uttered by a speaker;

providing the speech regions as input to a first machine learning (ML) model, wherein the first ML model is trained by receiving training data from a plurality of different speakers speaking various sentences or words and learning to output audio samples of the various sentences or words as spoken by a default speaker;

in response to the providing, receiving from the first ML model one or more audio samples of the speech regions as spoken by the default speaker, wherein the first ML model determines the one or more audio samples without extracting speech features from the speech regions; and combining the one or more audio samples to generate the sanitized version of the audio data sample; and forwarding, by the computing device, the sanitized version of the audio data sample to a ML training and inference system comprising a second ML model different from the first ML model, wherein the second ML model is an ML model that operates on identity-neutral information, and wherein the ML training and inference system uses the sanitized version of the audio data sample to train the second ML model in a manner that does not rely on the PII.

2. The method of claim 1 wherein the one or more data samples further includes a visual data sample, and wherein the method further comprises:
  sanitizing PII from the visual data sample, the sanitizing the PII from the visual data sample comprising:
   identifying one or more types of visual PII in the visual data sample; and
   removing, obfuscating, or transforming the one or more types of visual PII in the visual data sample.

3. The method of claim 2 wherein the one or more types of visual PII include biological features of a person appearing in the visual data sample.

4. The method of claim 3 wherein removing, obfuscating, or transforming the biological features comprises:
  blurring the biological features while retaining their general shape and position.

5. The method of claim 3 wherein removing, obfuscating, or transforming the biological features comprises:
  replacing the biological features with a random pattern, a generic placeholder, or a constant color value.

6. The method of claim 3 wherein removing, obfuscating, or transforming the biological features comprises:
  using a generative ML model to transform the biological features into those of a different person.

7. The method of claim 3 wherein removing, obfuscating, or transforming the biological features comprises:
  replacing the visual data sample with one or more embedding vectors of the biological features.

8. The method of claim 2 wherein the one or more types of visual PII include location features indicating a location of a person appearing in the visual data sample.

9. The method of claim 8 wherein removing, obfuscating, or transforming the location features comprises:
  using a semantic segmentation model to retain features of interest in a foreground of the visual data sample and replace a background of the visual data sample with a constant color value.

10. The method of claim 8 wherein removing, obfuscating, or transforming the location features comprises:
  using a generative model to retain features of interest in a foreground of the visual data sample and replace a background of the visual data sample with a neutral or synthetic environment.

11. The method of claim 2 wherein the one or more types of visual PII include text associated with a person appearing in the visual data sample.

12. The method of claim 11 wherein removing, obfuscating, or transforming the text comprises:
  blurring or censoring the text.

13. The method of claim 11 wherein removing, obfuscating, or transforming the text comprises:
  replacing the text with a generic template that is representative of a type of information the text is meant to convey.

14. The method of claim 1 wherein the training of the second ML model involves, by a person associated with the ML training and inference system, manually inspecting and labeling the sanitized version of the audio data sample based on its content.

15. The method of claim 1 wherein the second ML model that is trained using the sanitized version of the data sample is a speech recognition model, a liveness detection model, or an object recognition model.

16. The method of claim 1 wherein the default speaker is a randomly selected speaker from the plurality of different speakers from which the training data is obtained.

17. A non-transitory computer readable medium having stored thereon program code executable by a computing device, the program code comprising:
  code that causes the computing device to receive an audio data sample from a capture module;
  code that causes the computing device to sanitize personally identifiable information (PII) from the audio data sample, resulting in a sanitized version of the audio data sample, the sanitizing comprising:
   identifying speech regions in the audio data sample uttered by a speaker;
   providing the speech regions as input to a first machine learning (ML) model, wherein the first ML model is trained by receiving training data from a plurality of different speakers speaking various sentences or words and learning to output audio samples of the various sentences or words as spoken by a default speaker;
   in response to the providing, receiving from the first ML model one or more audio samples of the speech regions as spoken by the default speaker, wherein the first ML model determines the one or more audio samples without extracting speech features from the speech regions; and
   combining the one or more audio samples to generate the sanitized version of the audio data sample; and
  code that causes the computing device to forward the sanitized version of the audio data sample to a training and inference system comprising a second ML model different from the first ML model, wherein the second ML model is an ML model that operates on identity-neutral information, and wherein the ML training and inference system uses the sanitized version of the audio data sample to train the second ML model in a manner that does not rely on the PII.

18. A computing device comprising:
  a processor;
  a capture module; and
  a memory having stored thereon program code which, when executed by the processor, causes the processor to:
   receive an audio data sample from the capture module;
   sanitize personally identifiable information (PII) from the audio data sample, resulting in a sanitized version of the audio data sample, the sanitizing comprising:
    identifying speech regions in the audio data sample uttered by a speaker;
    providing the speech regions as input to a first machine learning (ML) model, wherein the first ML model is trained by receiving training data from a plurality of different speakers speaking various sentences or words and learning to output audio samples of the various sentences or words as spoken by a default speaker;
    in response to the providing, receiving from the first ML model one or more audio samples of the speech regions as spoken by the default speaker, wherein the first ML model determines the one or more audio samples without extracting speech features from the speech regions; and
    combining the one or more audio samples to generate the sanitized version of the audio data sample; and
   forward the sanitized version of the data sample to a ML training and inference system comprising a ML model, wherein the ML training and inference system uses the sanitized version of the data sample to train the ML model to carry out a task different from the sanitizing.

\* \* \* \* \*